Figure 1:
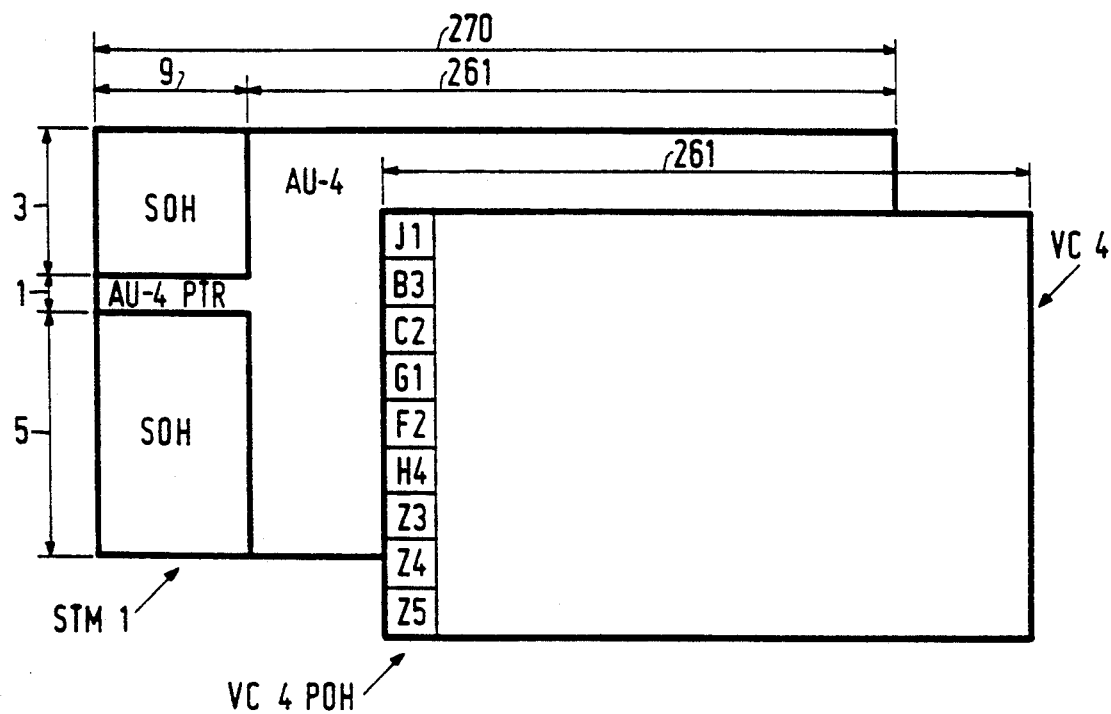

United States Patent [19]

Urbansky

[11] Patent Number: 5,260,940
[45] Date of Patent: Nov. 9, 1993

[54] CIRCUIT ARRANGEMENT FOR BIT RATE ADAPTATION

[75] Inventor: Ralph Urbansky, Schwaig, Fed. Rep. of Germany

[73] Assignee: U.S. Philips Corporation, New York, N.Y.

[21] Appl. No.: 628,793

[22] Filed: Dec. 17, 1990

[30] Foreign Application Priority Data

Dec. 23, 1989 [DE] Fed. Rep. of Germany ....... 3942885

[51] Int. Cl.$^5$ .............................................. H04J 3/07
[52] U.S. Cl. .................... 370/84; 375/118; 377/39
[58] Field of Search ............... 370/84, 102; 375/118; 369/60; 307/475; 377/39

[56] References Cited

U.S. PATENT DOCUMENTS 4,764,942  8/1988  Shigaki et al. ................ 375/118
4,791,652  12/1988 McEachern et al. ............ 375/118
4,811,340  3/1989  McEachern et al. ............ 370/102

Primary Examiner—Douglas W. Olms
Assistant Examiner—Min Jung
Attorney, Agent, or Firm—Anne E. Barschall

[57] ABSTRACT

A circuit arrangement for adapting the bit rates of two signals to each other and which comprises an elastic store (6). The useful data of a first frame-structured signal are written into this store (6) by means of a write address counter (7) and read out again by means of a read address counter (8). A phase comparator (16) is used for comparing the counts of these counters (7,8). In order to largely avoid jitter in the signal that has been read, a balancing counter (14) is provided which, on average, is stopped as often as the write address counter (7) is, but runs more smoothly than the write address counter. The means for controlling the operation of the balancing counter (14) comprise comparator circuits (12E, 12F, 12G) by means of which the operation of the frame counter (12) is monitored, an up/down counter (19) as well as various gates (11, 13, 17, 18). The phase comparator (16) compares the count of the balancing counter (14) to the count of the read address counter (8) and the output signal of the phase comparator (16) is used for producing the clock for the read address counter (8).

2 Claims, 2 Drawing Sheets

CIRCUIT ARRANGEMENT FOR BIT RATE ADAPTATION

The invention relates to a circuit arrangement for adapting the bit rates of two signals to each other, which arrangement comprises an elastic store into which the useful data of a frame-structured first signal are written with the aid of a write address counter and are read out again with the aid of a read address counter, and further includes a phase comparator for comparing the counts.

A circuit arrangement of this type is disclosed in German Patent Application DE-A-39 20 391 (filing date: 22.06.1989); in a digital transmission system this arrangement is necessary for recovering the frame-structured useful data as plesiochronous data signals. Therefore, only the useful data are written into the elastic store because the counter is stopped with all other data of the signal and the count of the write address counter denotes the addresses at which data are stored in the elastic store. Accordingly, the count of the read address counter denotes the addresses of the memory locations from which the useful data are read out again.

Reading the useful data is to be effected in a manner such that the deviations from the nominal bit rate of the recovered plesiochronous signal remain within the prescribed tolerance limits. A correction of the reading speed within these tolerance limits is necessary, for example, to prevent the elastic store from overflowing. Therefore, the counts of the two counters are to be monitored. The phase comparator which produces the difference between the counts or a value equivalent thereto is used for this monitoring. If the output signal of the phase comparator is used as a control error for a customary phase-locked loop, by means of which loop the clock for the read address counter is generated, this is disadvantageous with large abrupt control errors in that the read clock and also the plesiochronous signal are affected by a strong jitter.

Such control errors occur, for example, when the useful data are transmitted in a Synchronous Transport Module-1 (further details below). The write address counter is then to be stopped for several bytes; thus it runs highly erratically. This erratic operation is also reflected in the control error which has disadvantageous consequences for the plesiochronous signal.

It is an object of the invention to provide a circuit arrangement having the characteristic features mentioned in the opening paragraph, in which the jitter in the clock for the read address counter is largely avoided.

This object is achieved in that a balancing counter is provided whose count is compared to the count of the read address counter by means of the comparator and in that means are provided for controlling the operation of the balancing counter in such a way that the balancing counter runs more smoothly than the write address counter.

An advantageous embodiment for avoiding disturbances has the feature that means are provided for aligning the balancing counter with the write address counter at predetermined instants.

Figure 2:
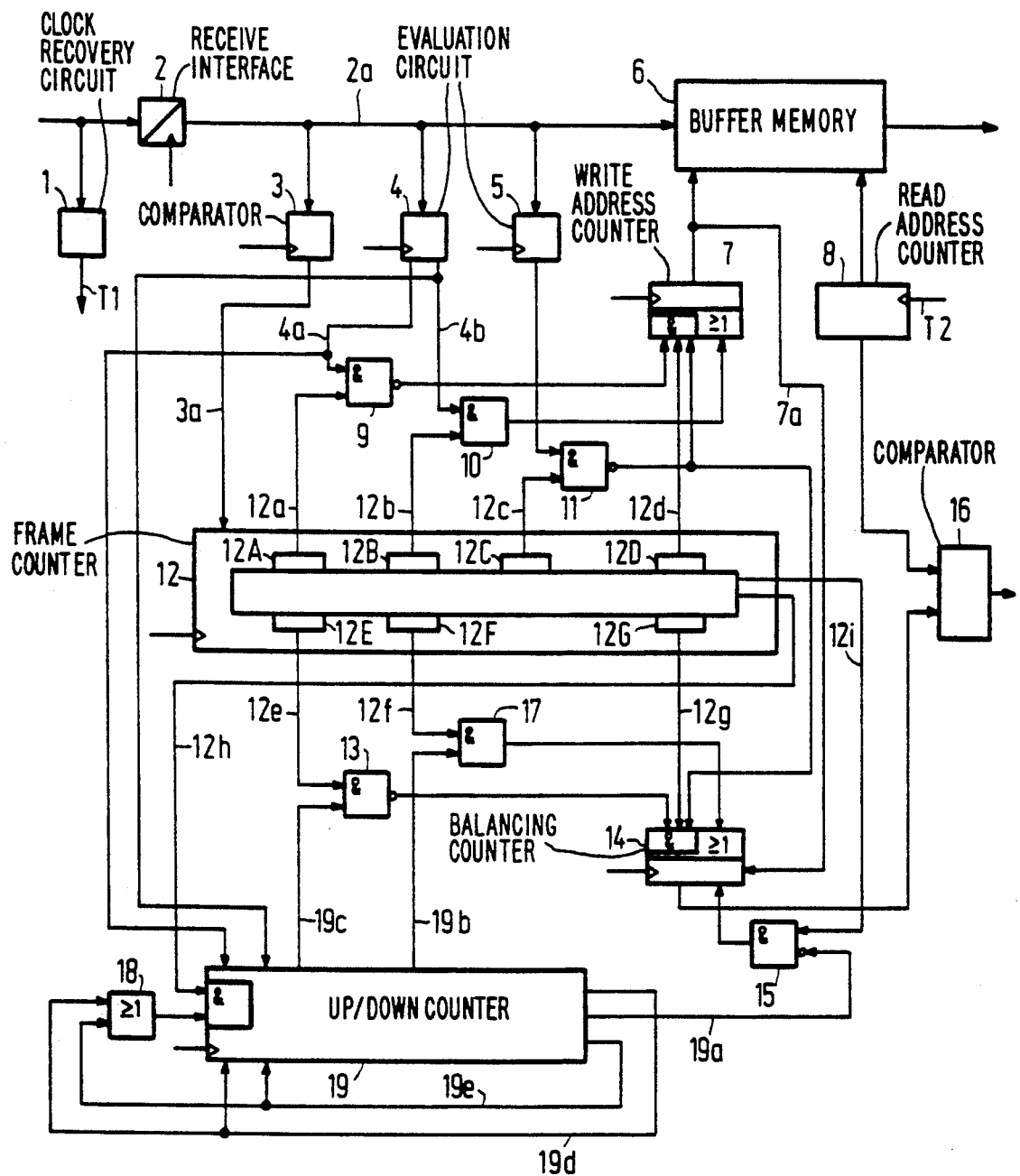

The invention will be further explained with reference to the drawing Figures and an exemplary embodiment, in which:

FIG. 1 shows a diagrammatic representation of the frame structure of a Synchronous Transport Module-1 (STM-1) and FIG. 2 shows a clock adaptation circuit arrangement having characteristic features of the arrangement according to the invention.

In the diagrammatic representation of an STM-1 frame as shown in FIG. 1 all the binary information of the frame is subdivided into rows. The frame consists of nine rows as can be understood from the numbers on the left in FIG. 1. Each row contains 270 bytes denoted by the number at the top of FIG. 1. The whole frame is subdivided into three areas (for details compare, for example, CCITT-Recommendations G.707, G.708, G.709, Blue Book, Geneva 1988).

The first area consists of the actual useful information, included in a virtual container VC4, which is also represented in FIG. 1 by way of rows. Each row of the virtual container VC4 consists of 261 bytes; each of the rows is headed by one-byte long control information J1, B3, C2, . . . Z5. The remaining bytes of the container VC4 consist of 18 fixed stuff bytes, a single special byte containing six useful bits, one fixed and one justification opportunity bit, and 241 useful bytes. The justification indication for the justification opportunity bits is contained in five of the fixed stuff bytes.

The second area of the frame is the section overhead SOH filling the first nine bytes of specific frame rows. This area contains bytes used, for example, for frame alignment, error monitoring and network management.

The third area is the pointer area PTR of the administrative unit AU-4. Here there are bytes, which, inter alia, denote the position of the virtual container VC4 within a frame. This position is not fixed and neither is it linked with the frame structure, i.e. the container can commence in one frame and terminate in a second frame. Furthermore, the pointer row provides space for six bytes used for clock alignment and in except cases taken up either by meaningless filling bytes (positive byte justification) or taken up all by additional useful information bytes (negative byte justification). As a rule, three bytes containing justification bits and three bytes containing information bits are present. The justification indication for this byte justification is also contained in the pointer area.

The overall frame period is 125 μs; this corresponds to a 155.52 Mbit/s bit rate.

The main components of the circuit as shown in FIG. 2 are a buffer memory 6, a write address counter 7, a read address counter 8, a frame counter 12 and a balancing counter 14. The count of the balancing counter 14 and the count of the read address counter 8 are compared to each other by means of a comparator 16 whose output signal indicates the control error of a control loop (not shown). This control loop produces the read clock T2 for the read address counter 8 with which the bits are read from the buffer memory 6. The nominal bit rate of the clock T2 is 139.264 MHZ.

Two requirements are attached to a change of this clock, first that, when possible, the distance between write and read addresses is equal to a predetermined distance during the entire operation of the circuit arrangement is and second that the deviation of the read clock T2 from 139.264 MHz remains within prescribed boundaries (±15 ppm). How these two requirements are fulfilled simultaneously in accordance with the invention will now be explained in detail.

An input signal structured in STM-1 frames is applied to a clock recovery circuit 1 and a receive interface 2. The receive interface 2 produces a binary encoded input signal from the CMI encoded signal and the clock recovery circuit generates the bit clock T1 necessary for the binary signal. All clock dependent building blocks of the circuit according to FIG. 2 are timed with this bit clock T1 unless expressly stated otherwise.

A comparator 3 transmits a pulse to the set input of the frame counter 12 over line 3a once the frame alignment codeword has appeared in a signal on line 2a.

The frame counter 12 counts all bits of a frame and produces one-bit long pulses at its outputs 12a to 12g while passing through predetermined counts. Comparator circuits producing such pulses are denoted by reference characters 12A to 12G. Their internal structures are obvious to the expert once he has obtained operation details. This also holds for all further building blocks which are only characterized by their mode of operation.

An evaluation circuit 4 evaluates the justification indication for bytes contained in the pointer area. This information indicates whether at a subsequent and predetermined position of the frame there has been performed positive or negative byte justification at the transmit end. If, contrary to the rule, there has been a positive byte justification, a logic "one" will be produced on line 4a for the duration of one frame. This logic value will affect a NAND-gate 9 in a manner such that its output moves to a logic "zero" when the comparator circuit 12A establishes that the frame counter is reading exactly those bits belonging to the justified byte.

By means of the output signal of the NAND-gate 9 the write address counter 7 is stopped so that the justified bytes are not also written into the buffer memory 6.

If, contrary to the rule, there has been negative byte justification, the appropriate bytes will contain useful information bits and the write address counter 7 will have to proceed so that these bytes are written into the buffer memory 6. In that case the evaluation circuit 4 produces at its output 4b a logic "one" which, together with an AND-gate 10, the comparator circuit 12B and the logic contained in the write address counter, provides that the counter continues counting without any complications. The logic in the write address counter 7 consists of an AND-gate that has three inputs and an OR-gate that has two inputs, its first input being connected to the output of the AND-gate 10 and its second input being connected to the output of the AND-gate 50 included in the write address counter 7.

Since an STM-1 frame also comprises single justification bit positions which may be occupied by a useful information bit or a filling bit, a second evaluation circuit 5 is provided which evaluates the justification indication for these single bits. If justification has taken place, the evaluation circuit 5 will apply a full row of logic "ones" to an input of a NAND-gate 11, whose other input is connected to the output of a comparator circuit 12C by means of line 12c. The comparator circuit 12C produces a pulse when the frame counter has reached the position of the justification bit. This pulse sets the output of the NAND-gate 11 to logic "zero" and thus stops the write address counter 7 for one clock period, due to the connection to the AND-gate of the write address counter 7. If no justification has taken place, the write address counter will continue operating at the justification bit position.

All the bits or bytes that belong to the Overhead area or Pointer area and never contain useful information bits are not written into the buffer memory 6 either. The write address counter 7 is stopped at the positions concerned by means of a comparator circuit 12D and a line 12d leading to an input of the AND-gate included in the write address counter 7. At positions not usually containing useful information, the write address counter is also stopped by the comparator circuit 12D unless the continuation of the operation is given priority to (compare above).

The operation of the balancing counter 14 is controlled by means of the comparator circuits 12E, 12F and 12G, by the up/down counter 19 with gates 13, 15, 17 and 18 as well as gate 11 in a manner such that it is stopped for as many clock periods per row as the write address counter 7 is, but with the difference that these interruptions are divided over the rows of the frame as uniformily as possible. Consequently, —while discarding the variable stuff bytes—the balancing counter 14 will present at the end of a row the same count as the write address counter 7, if they are aligned over a line 7a—like in the present example—at the beginning of a row.

The counterpart portion of the comparator circuit 12D is the comparator circuit 12G which stops the balancing counter 14 as many times as the comparator circuit 12D stops the counter 7, i.e. 225 bit clocks per row (one row consists of 2160 bit clocks). This is equal to the number of bits per row which, as a rule, are not useful information bits. Exceptions to the rule occur when negative or positive byte justification has taken place. This exception will be further explained hereinbelow.

The instants at which the comparator circuit 12G causes the counter 14 to stop are distributed relatively uniformly over a row, but instants that become instants at which a stop is made as a result of bit justification are to be avoided.

In addition, the balancing counter 14 is stopped at the same instants at which the write address counter 7 is stopped as a result of singlejustification bits, as is shown by a connection from the output of the NAND-gate 11 over line 11a to an input of an AND-gate of the balancing counter 14 (the balancing counter 14 comprises the same internal logic as the read address counter 8).

In order to balance or equlize the irregular operation of the write address counter 7 that is based on variable justification bytes, the up/down counter 19 is provided which is set via lines 4a and 4b. If three positive byte justifications have taken place, the up/down conter 19 is incremented by 24 (3×8 count units with the aid of a signal on the line 4a, up/down counter 19 is by 24 count units with the aid of a signal on 4b in case of negative justification.

Therefore, in the up/down counter 19, the number of clock pulses is stored during which the balancing counter 14 is to be stopped as well (when there is a positive count of the counter 19) or contrary to the rule, is to proceed (when the count of counter 19 is negative). If the up/down counter 19 indicates zero, no further changes in the operation of the balancing counter 14 are necessary.

Over a line 12h the frame counter 12 applies for each frame a pulse (logic "one") to an input of an internal AND-gate of the up/down counter 19. A logic "one" at the output of this gate enables the counting of the counter 19 by means of the clock signals at its clock input. The second input of this internal AND-gate is connected to the output of an OR-gate 18 whose two inputs are connected over one of the lines 19d and 19e to the outputs of an internal logic of the up/down counter 19. A logic "one" is transmitted over line 19d as long as the count of the up/down counter 19 exceeds zero and over the line 19e as long as its count is less than zero. In all further cases a logic "zero" is transmitted.

The lines 19d and 19e are also connected to the inputs of the up/down counter 19 that determine the counting direction. If the count is positive, down-counting is performed and if it is negative up-counting is performed. No counting takes place with the zero count.

The actual counting mechanism of the up/down counter 19—discussed so far—is shifted only once every 128 frame pulses. Consequently, the up/down counter 19 contains the registers necessary for performing this division.

For controlling the balancing counter 14 the up/down counter 19 produces every 128 frames on one of its output lines 19b or 19c, depending on the count of its counter, a logic "one" for the duration of one frame. A logic "one" is produced on line 19b when the count is negative and on line 19c when the count is positive. Via the gates 13 and 17 connected to these lines the operation of the balancing counter is influenced in the manner in which the write address counter 7 is influenced. Comparator circuits 12E and 12F determine at what position of the frame the balancing counter 14 continues operating or is stopped.

The balancing of an irregular operation of the write address counter 7, caused, for example, by three justification bytes, is completed after approximately 3000 frames. As long as this balancing has not yet taken place, the balancing counter must not be aligned with the read address counter 7. For fulfilling this condition, both a line 19a, a line 12i and an AND-gate 15 are provided. On line 19a a logic "one" is transmitted when the count of the up/down counter 19 is "zero", otherwise, a logic "zero" is transmitted. Over line 12i a logic "one" is transmitted when the frame counter is positioned at the beginning of a row. If there is a logic "zero" on line 19a, and the frame counter is positioned at the start of a row, alignment is permitted and the count of the read address counter 7 is taken over by the balancing counter 14 via line 7a.

What is claimed is:

1. Circuit for adapting the bit rate of an output signal comprising
    a) an elastic store for storing useful data from a frame-structured first signal;
    b) a write address counter for controlling writing of the useful data into the elastic store;
    c) a read address counter for controlling reading of the useful data from the elastic store, to produce the output signal;
    d) a balancing counter;
    e) a phase comparator for comparing counts of the read address counter and the balancing counter; and
    f) means for controlling the balancing counter to run more smoothly than the write address counter.

2. The circuit of claim 1 wherein the controlling means aligns the balancing counter with the write address counter at predetermined instants.

* * * * *